United States Patent
Ganguli et al.

(10) Patent No.: US 10,239,021 B2
(45) Date of Patent: Mar. 26, 2019

(54) FOULING RESISTANT COATING FOR FILTRATION MEMBRANES AND METHODS OF PRODUCING AND USING SAME

(75) Inventors: Rahul Ganguli, Oak Park, CA (US); Vivek Mehrotra, Simi Valley, CA (US); Tony Ten-Luen Liao, South Pasadena, CA (US)

(73) Assignee: Teledyne Scientific & Imaging, LLC, Thousand Oaks, CA (US)

( * ) Notice: Subject to any disclaimer, the term of this patent is extended or adjusted under 35 U.S.C. 154(b) by 445 days.

(21) Appl. No.: 13/523,037

(22) Filed: Jun. 14, 2012

(65) Prior Publication Data

US 2013/0334130 A1    Dec. 19, 2013

(51) Int. Cl.
| | | |
|---|---|---|
| *B01D 67/00* | (2006.01) | |
| *C09D 7/63* | (2018.01) | |
| *C09D 105/12* | (2006.01) | |
| *C09D 101/28* | (2006.01) | |
| *C09D 105/00* | (2006.01) | |
| *C09D 5/16* | (2006.01) | |
| *B01D 65/08* | (2006.01) | |

(Continued)

(52) U.S. Cl.
CPC ......... *B01D 67/0088* (2013.01); *B01D 65/08* (2013.01); *B01D 71/68* (2013.01); *C09D 5/1687* (2013.01); *C09D 7/63* (2018.01); *C09D 101/28* (2013.01); *C09D 101/284* (2013.01); *C09D 101/286* (2013.01); *C09D 105/00* (2013.01); *C09D 105/12* (2013.01); *B01D 2325/04* (2013.01); *B01D 2325/48* (2013.01); *C08K 5/005* (2013.01)

(58) Field of Classification Search
CPC ........ B01D 29/00; B01D 65/08; B01D 69/02; B01D 2325/48; B01D 71/68; B01D 37/02; B01D 67/0088; B01D 2325/04; C09D 105/00; C09D 105/12; C09D 101/286; C09D 101/284; C09D 101/28; C09D 5/1687; C09D 7/1233; C08K 5/005
USPC ............. 210/500.27–500.29, 500.33–500.34, 210/500.36–500.38, 500.41–500.42, 210/500.21, 500.1
See application file for complete search history.

(56) References Cited

U.S. PATENT DOCUMENTS

| | | | |
|---|---|---|---|
| 3,996,131 A | * 12/1976 | Conn | B01D 61/145 210/636 |
| 4,087,388 A | 5/1978 | Jensen et al. | 260/2.5 M |

(Continued)

FOREIGN PATENT DOCUMENTS

WO    WO 9402629 A1 *  2/1994 ............... C12Q 1/26

OTHER PUBLICATIONS

STN transcript.*

(Continued)

*Primary Examiner* — David C Mellon
*Assistant Examiner* — Liam Royce
(74) *Attorney, Agent, or Firm* — M. J. Ram and Associates (57) ABSTRACT

A conformal coating that resists fouling by waterborne contamination in aquatic environments, a method for fabricating the coating, and a filter having such a coating are disclosed. The coating comprises a hydrophilic polymer and a surfactant wherein the surfactant undergoes a phase change upon exposure to a saline solution. Also disclosed are in situ methods for regenerating anti-fouling filters having the fouling resistant coating.

2 Claims, 4 Drawing Sheets

(51) Int. Cl.
  *B01D 71/68* (2006.01)
  *C08K 5/00* (2006.01)

(56) References Cited

U.S. PATENT DOCUMENTS

| | | | | |
|---|---|---|---|---|
| 4,421,660 | A | * | 12/1983 | Solc nee Hajna ....... B01J 13/12 252/62.54 |
| 4,845,132 | A | | 7/1989 | Masuoka et al. ............... 521/53 |
| 5,468,390 | A | | 11/1995 | Crivello et al. ............. 210/490 |
| 6,177,011 | B1 | * | 1/2001 | Hachisuka ......... B01D 67/0088 210/490 |
| 6,913,694 | B2 | | 7/2005 | Koo et al. ................ 210/500.38 |
| 2002/0193257 | A1 | * | 12/2002 | Lee et al. ...................... 507/200 |
| 2005/0176893 | A1 | | 8/2005 | Rana et al. ................... 525/242 |
| 2009/0143258 | A1 | * | 6/2009 | Welton et al. ................ 507/221 |
| 2010/0051538 | A1 | | 3/2010 | Freeman et al. ......... 210/500.33 |
| 2010/0059433 | A1 | | 3/2010 | Freeman et al. ........... 210/321.6 |
| 2010/0133172 | A1 | | 6/2010 | Song et al. ............. 210/500.37 |
| 2010/0159143 | A1 | | 6/2010 | Moya et al. ................. 427/384 |
| 2011/0110894 | A1 | * | 5/2011 | Drahos et al. ............... 424/93.3 |
| 2012/0048805 | A1 | * | 3/2012 | McCutcheon ..... B01D 67/0088 210/654 |
| 2012/0168370 | A1 | * | 7/2012 | Aoki ...................... B01D 61/02 210/500.27 |
| 2012/0241371 | A1 | * | 9/2012 | Revanur .............. B01D 53/228 210/488 |
| 2013/0171484 | A1 | * | 7/2013 | Baginska ............ H01M 10/056 429/62 |

OTHER PUBLICATIONS

Sagle, A.C. 'PEG Hydrogels as anti-fouling Coatings for Reverse Osmosis', The University of Texas at Austin 2009 [online], 187 pages, U.S. Pat. No. 3,369,184 (PhD Dissertation). [Retrieved on Jul. 10, 2012] Retrieved from the Internet:< URL: http://www.lib.utexas.edu/etd/d/2009/saglea49326/saglea49326.pdf>.

Mizoguchi. K., Fukuia, K., Yanagishitab. H.. Nakaneb, T. and Nakatac, T. *Ultrafiltration behavior of a new type of non-ionic surfactant around the CMC*, Journal of Membrane Science, vol. 208, No. 1-2 (Oct. 2002). pp. 285-288.

* cited by examiner

FOULING RESISTANT COATING FOR FILTRATION MEMBRANES AND METHODS OF PRODUCING AND USING SAME

STATEMENT AS TO FEDERALLY SPONSORED RESEARCH

This invention was made with Government support under Grant No. W911NF-09-C-0023 awarded by the Defense Advanced Research Projects Agency (DARPA). The federal government may have certain rights in the invention.

BACKGROUND

1. Technical Field

This invention relates generally to coated filtration membranes and more particularly to the improved resistance of such coated membranes to aquatic fouling by aqueous borne contaminants.

2. State of the Art

A common problem encountered in the processing of aqueous media by membrane filters is the reduction of flux due to fouling. Fouling may be caused by one or more materials present in the aqueous media such as dissolved species, colloidal species, suspended matter, surfactants or surfactant-like chemicals, microbiological entities, and the like. The fouling species can be selectively concentrated at, or absorbed to, the active surface of the membrane filter, thereby reducing the effectiveness of the filter. A decrease in flux due to fouling typically results from the deposition of one or more layers of such material on the input surface of the membrane filter. These layers usually thicken over time, reducing the rate of permeate flow such that higher pressures become necessary to maintain the flow rate. This typical mode of operation also requires frequent backflushing and cleaning operations that increase the size of the filtration system, the power required for filtration, and the logistics of installing and maintaining the system.

While fouling in a general sense occurs on a wide variety of surfaces and due to many different environmental cues, it is generally presumed that fouling by water-borne species is promoted or augmented by the presence of hydrophobic sites on a filter. Hydrophobic sites on membranes can, for example, act as accumulation sites for organic contaminants in water and initiation sites for the colonization and development of biofilms. Membrane filters used to process aqueous media are commonly prepared from hydrophobic polymers such as polysulfone and are therefore quite susceptible to fouling, particularly by biological materials or products such as proteinaceous species. In addition to affecting flux, the size selectivities of hydrophobic membrane filters may be modified by the fouling process and surface pore diameters can be changed by the deposition of adsorbent foulants on the pore walls.

Information relevant to attempts to alleviate such problems by increasing the surface hydrophilicity of a membrane in order to promote fouling resistance can be found in the following references: U.S. Pat. Nos. 4,087,388; 4,845,132; 5,468,390; 6,177,011; 6,913,694; U.S. Patent Application No. 2005/0176893; U.S. Patent Application No. 2010/0159143; U.S. Patent Application No. 2010/0133172; U.S. Patent Application No. 2010/0059433 A1; A. C. Sagle "PEG hydrogels as anti-fouling coatings for reverse osmosis membranes" (2009) Ph.D. Dissertation, *The University of Texas at Austin* Publ. No. 3369184, 187 pages; and K. Mizoguchi, K. Fukuia, H. Yanagishitab, T. Nakaneb and T. Nakatac "Ultrafiltration behavior of a new type of non-ionic surfactant around the CMC" (2002) *Journal of Membrane Science* 208 285-288. However, each of these references suffers from one or more of the following disadvantages:

1. Coatings for fouling mitigation reduce the initial flux of water through hydrophilic filter materials due to the additional hydraulic resistance presented by the relatively thick and uneven layer of coating material. This reduction in initial water flux typically cancels out any beneficial reduction in flux loss provided by the coating due to improved fouling resistance;
2. Most coatings are coated on top of membrane layers and, since they are physically weak, do not withstand abrasive feeds such as seawater;
3. Hydrophilic coatings are not expected to withstand chemical clean cycles because they are inherently not as chemically resistant as hydrophobic coatings;
4. A majority of coatings cannot be regenerated in situ in the field; this precludes regeneration of coatings removed through physical abrasion and/or chemical cleaning in a simple and cost effective manner; and
5. Approaches other than coatings also suffer from significant disadvantages. Blended membranes with combined hydrophilic and hydrophobic groups, for example, are more costly to fabricate and more susceptible to damage during chemical cleaning.

Other approaches to reduce fouling typically involve pretreatment of feedwater with potentially hazardous chemicals including, for example, ion precipitation and oxidation by halogenated species such as chlorine and iodine. Such treatment also significantly increases the environmental footprint of the membrane step and costs associated with membrane operation.

Thus there remains a need within the aqueous media processing industry for nonhazardous methods and filters that reduce the rate of fouling and therefore the overall cost of filtration.

BRIEF DESCRIPTION OF THE DRAWINGS

Further objects, features and advantages of the invention will become apparent from the detailed description below, when read in conjunction with the accompanying drawings in which.

DETAILED DESCRIPTION

The following description is of a best mode presently contemplated for practicing the invention. This description is not to be taken in a limiting sense but is made merely for the purpose of describing the general principles of the invention whose scope may be ascertained by referring to the appended claims.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of the invention. This is done merely for convenience and to give a general sense of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although a few suitable, exemplary processes and materials are described below, other processes and materials similar or equivalent to those described herein can also be used in the practice or testing of the invention. All publications, patent applications, patents, and other references mentioned herein are incorporated by reference in their entirety. In case of conflict, the present specification, including definitions, will control. In addition, the materials, processes, and examples are illustrative only and not intended to be limiting.

The following definitions refer to the particular embodiments described herein and are not to be taken as limiting; the invention includes equivalents for other undescribed embodiments.

As used herein, the term "conformal coating" is intended to mean a layer of material applied globally to all the surfaces of an object, especially one that substantially matches and preserves the shape and dimensions of the object.

As used herein, the term "filter" is intended to mean any porous substance through which a material is passed to remove suspended impurities or to recover solids, including without limitation cloth, paper, membrane, porous porcelain and a layer of charcoal or sand.

As used herein, the term "flux" is intended to mean the amount of material that flows through a unit area per unit time.

As used herein, the term "fouling" is intended to mean the reduction of flux through a filter resulting from the accumulation of contaminants on the surface of the filter, including without limitation dissolved species, colloidal species, suspended matter, surfactants or surfactant-like chemicals, biological and microbiological entities, proteinaceous materials, and the like.

As used herein, "permeate volume" is intended to mean the total amount (volume) filtered over a period of time.

As used herein, "supramolecular assembly" is intended to mean a chemical system composed of a discrete number of assembled molecular subunits or components. Examples of supramolecular assemblies include without limitation micelles, microemulsions, membranes, vesicles, and liquid crystals.

The invention disclosed herein relates generally to conformal coated filters and, more particularly, to the improved resistance of such coated filters to aquatic fouling by aqueous borne contaminants. In the embodiments disclosed herein, a novel coating process is used to apply a thin, uniform and conformal fouling resistant coating to a membrane filter. In one embodiment, the polymer is a composite of polydopamine and a long chain surfactant such as N-erucyl-N,N-bis(2-hydroxyethyl)-N-methyl ammonium chloride, a typical viscoelastic surfactant.

When monomeric dopamine is mixed with water at an appropriate pH, a heterogeneous polymerization reaction proceeds resulting in a deposition of hydrophilic polydopamine thin films at adjacent surfaces. However, deposition of such pure polydopamine thin films on surfaces of filters results in a significant reduction of pure water flow rates (U.S. Patent Application No. 2010/0059433 A1).

In contrast, we have found that using a mixture of hydrophilic polymer and surfactant allows the deposition of extremely thin antifouling coatings that do not measurably affect pure water flow rates. The typical process for achieving this result is as follows:

(a) The coating solution composition includes a hydrophilic polymer and a surfactant;

(b) The composition of the coating solution is controlled to prevent premature polymerization of the polymer, resulting in the deposition of a relatively thin, uniform coating on the surface; and (c) Exposure of the polymerized coating to a saline environment induces a phase change in the coating. The type of phase change induced may be relatively simple or complex, including without limitation a salt induced gelation or formation of supramolecular assemblies such as micelles.

Control of premature polymerization is likely achieved through association of the surfactant with monomer, thereby reducing the rate of diffusion of the coating species significantly such that the monomer cannot polymerize quickly. This could be achieved, for example, where such association affected polymerization by slowing diffusion of the monomer to the surface of the membrane where polymerization occurs.

Slowing down diffusion of the coating species to the deposition surface can allow very thin, uniform coatings to be deposited on all surfaces, including those within the pores, such that every surface of the filter is substantially or completely coated. The thickness of the coating is usually less than or equal to 20 nm and typically 3-20 nm. A significant increase (usually $10^3$ to $10^4$) in shear dependent viscosity for the polydopamine-surfactant mixture relative to pure dopamine was observed, along with a corresponding absence of sheer dependent viscosity for either pure surfactant or pure dopamine, indicating that the surfactant is associated with the polydopamine. Therefore, the rate of diffusion is probably slowed by entanglement or some other type of association between molecules of polydompamine and surfactant in the coating. Furthermore, at least within the 10 hour time frame used for testing, this enhanced viscosity was apparently not due to an increase in bulk polymerization but rather an increase in polymerization at the surface of the membrane resulting in exquisitely thin and uniform coatings.

The phase change likely involves the formation of one or more supramolecular assemblies, including without limitation micelles containing surfactant or a combination of surfactant and polymer. The morphology and properties of such assemblies are known to be highly dependent upon the conditions under which they are formed, including the rate and method of fabrication as well as the presence of other materials during formation.

The presence of the coating can enable at least a threefold decrease in fouling as well as a corresponding reduction in power consumption. In addition, it appears that water binds very tightly to the coating and that foulants cannot easily exclude this water, leading to their poor adhesion. Furthermore, although each pore of the membrane is apparently covered with a sacrificial antifouling coating that wears off with time, the coating can be readily reformed in situ.

The coating can be regenerated in situ by backflushing the filter with reagents capable of removing a fouled coating, followed by fabrication of a new coating. The use of the surfactant phase is also crucial to this process because the coating, as a composite of a hydrophilic polymer such as polydopamine and the surfactant, can be readily removed by washing with a removal agent such as alcohol. In contrast, washing a pure polydopamine coating in the same manner does not remove that coating, and therefore the repeated removal and reapplication of a pure polydopamine coating would be much more difficult to perform in situ.

Figures 1A, 1B, 1C:
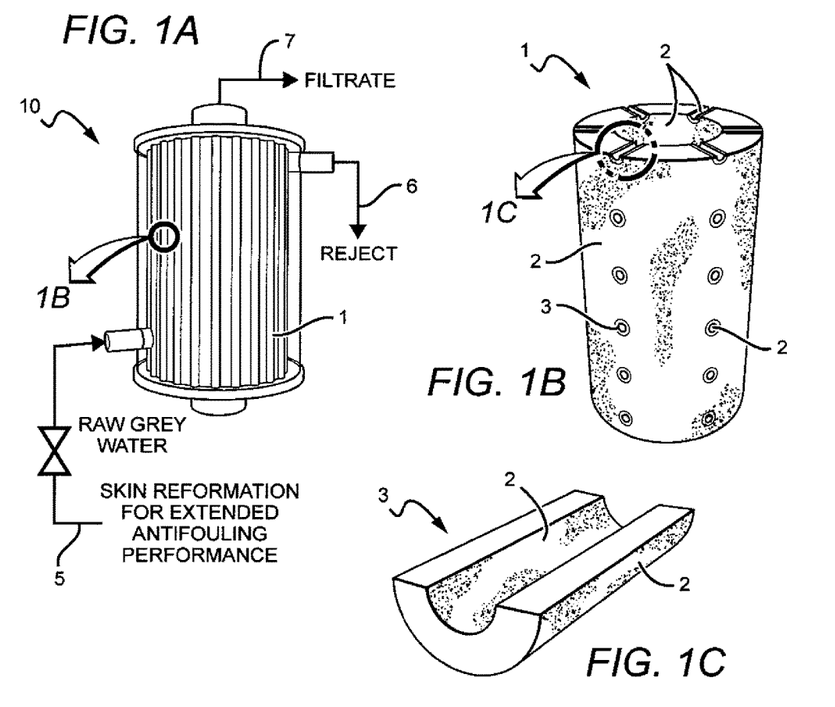
FIG. 1A is a schematic of a membrane filter with a hollow fiber configuration having a conformal fouling resistant coating on its surfaces, including inside of the pores, in accordance with one specific, exemplary embodiment of the invention.
FIG. 1B is an expanded view of FIG. 1A illustrating the coating on the surfaces of one hollow fiber, including the inside surfaces of the pores.
FIG. 1C is an expanded view of FIG. 1B illustrating the coating on the inside surfaces of one exemplary pore in the hollow fiber.

FIGS. 1A-C are schematic illustrations of one embodiment, a fouling resistant filter in which substantially every membrane surface is covered by a coating that includes a hydrophilic polymer and a surfactant. In particular, the surfaces within the pores of the membrane filter are covered by the coating. FIG. 1A is a schematic of a membrane 10 with a hollow fiber configuration having an antifouling skin coating on its surfaces. Raw gray (contaminated) feed water can flow into a first port 5 while rejected liquid and filtrate can flow out though a second or third port, 6 and 7 respectively. FIG. 1B is an expanded view of one coated hollow fiber 1 in FIG. 1A illustrating the coating 2 on the outer and inner surfaces of that fiber, including the inside surfaces of the pores 3. FIG. 1C is an expanded view of FIG. 1B illustrating the coating 2 on the outer and inner surfaces of one pore 3.

One exemplary process for making a conformal coating of this type is described below in Example 1.

EXAMPLE 1

A composition containing 4 g of the hydrophilic monomer dopamine hydrochloride (Sigma Aldrich) and 1000 g of a Tris buffer is mixed to create solution A. Tris buffer can be made using recipes commonly available in the literature. To 50 ml of solution A, 50 ml of the viscoelastic surfactant WGA 209 (N-erucyl-N,N-bis(2-hydroxyethyl)-N-methyl ammonium chloride, Weatherford Chemicals) was mixed and allowed to stand until all the air bubbles introduced during mixing disappeared. This composition contrasts with hydrophilic polymer/surfactant coating solutions used in other applications where the surfactant is limited to about 10 wt % (10% w/w) of coating solution. The higher weight percent of the surfactant in this case enabled the formation of ultrathin coatings inside pores without reducing the initial flux of water through the membranes.

Typically the mixture is allowed to stand for 1-2 hours and then flowed under pressure through the target membrane (one such exemplary membrane is a hollow fiber ultrafiltration membrane manufactured by Spectrum Labs; part #K3-500S-200-01S-0294-2). This enables the coating solution to fully permeate all parts of the membrane including all its pores. The filter was then exposed to a 6% NaCl saline solution, thereby generating a phase change in the surfactant which likely induces the formation of supramolecular structures such as micelles. After 10 hrs, the membrane is flushed with dilute deionized water. Alternatively, this final rinsing step may be omitted such as, for example, when the filter is used to purify a saline solution such as seawater.

The flux observed for clean tap water was then measured for both the coated membrane and an uncoated membrane of the same type (control) under a transmembrane pressure of 15 psi in a dead-end filtration mode. Typically, pure water flux was not substantially affected by the coating and tended to be in the range of 90% to 110% of the pure water flux of the uncoated membrane. The typical resulting flux loss of less than about 10%, for a 10 hr coating deposition time, clearly suggests a relatively thin coating or layer (skin or skin layer).

Subsequently, the filters were tested with fouling water made using a recipe provided by the United States Defense Advanced Research Projects Agency (DARPA). Briefly, the DARPA fouling water was prepared by adding 32 g of Instant Ocean, 132.5 mg Arizona fine test dust (ISO specification 12103-1 A2), 20 mg Orchid Pro (by Turf Pro USA) and 10 mg Klamath Blue Green Algae Powder to 1 kg of dechlorinated water.

Figure 2:
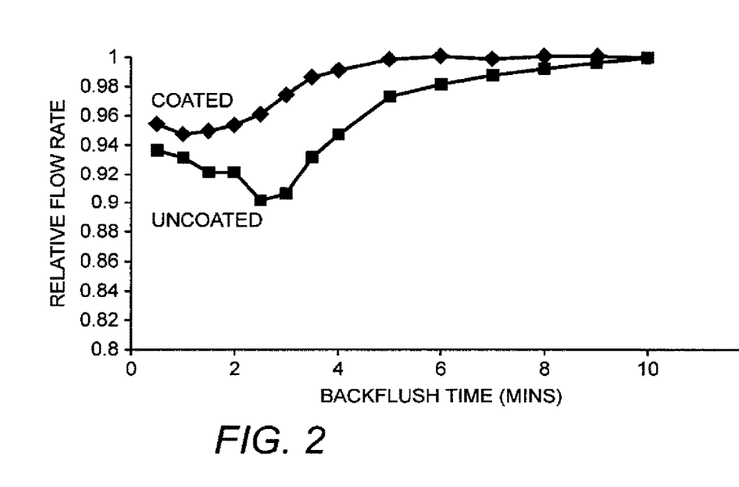
FIG. 2 is a plot of the flux recovery as a function of back flush time for a coated and uncoated hollow fiber membrane filter after they had each, respectively, filtered contaminated feed water from the same source for a short period of time (40 minutes).

Typically, after filtration, the filter is cleaned in situ using backflushing. In this step, a portion of the permeate (filtered) water is flowed back from the outlet to the inlet. The flow reversal helps to detach foulants that accumulate at the filter surface, thereby prolonging the lifetime of the filtration operation before chemical cleaning is necessary. The extent of backflushing for our membranes was determined by filtering the contaminated water for 40 minutes under a transmembrane pressure of about 15 psi and then documenting the flux recovery during the backwash step, at a transmembrane pressure of about 17 psi. FIG. 2 is a plot of flux recovery as a function of backwash time for a coated and uncoated hollow fiber membrane filter after each had filtered DARPA fouling water for 40 minutes. Flux recovery is measured here as the ratio of the initial flow rate (flux recorded at time=0 minutes) relative to the flux at the end of 10 minutes during the backwash step. For the coated membrane, the flux during backwash reached a stable value within 4 minutes, whereas the flux increase continued beyond 10 minutes for the uncoated membrane. Therefore, a greater than twofold reduction in backflush time was enabled by the antifouling coating. We anticipate that the antifouling coating reduced the adhesion between the foulant layer and the coating on the filter surface, resulting in an easier and faster removal of the foulant layer during backwash.

Figure 3:
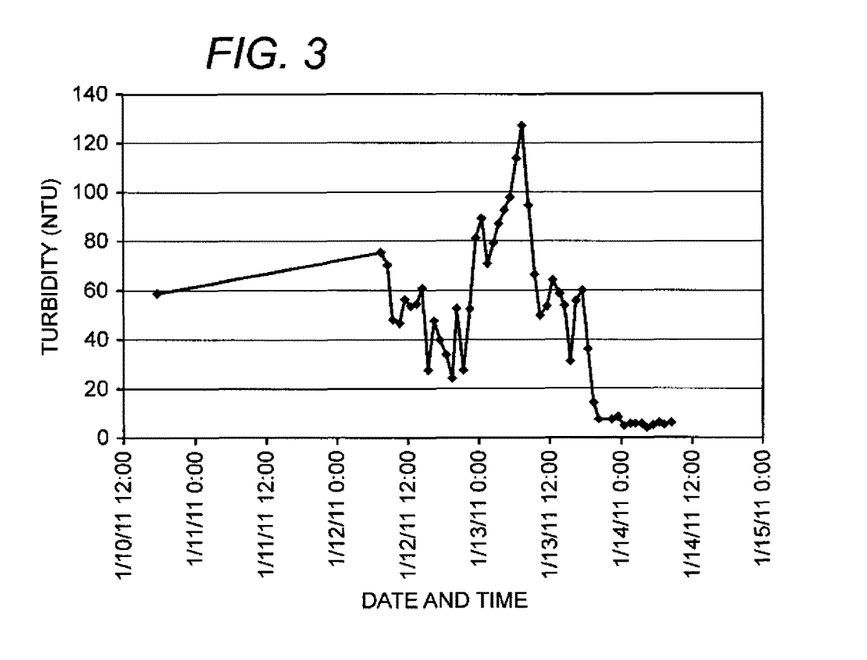
FIG. 3 is a record of the turbidity of contaminated feed water as a function of time during extended testing (15 days) of one coated and one uncoated hollow fiber membrane filter.
Figure 4:
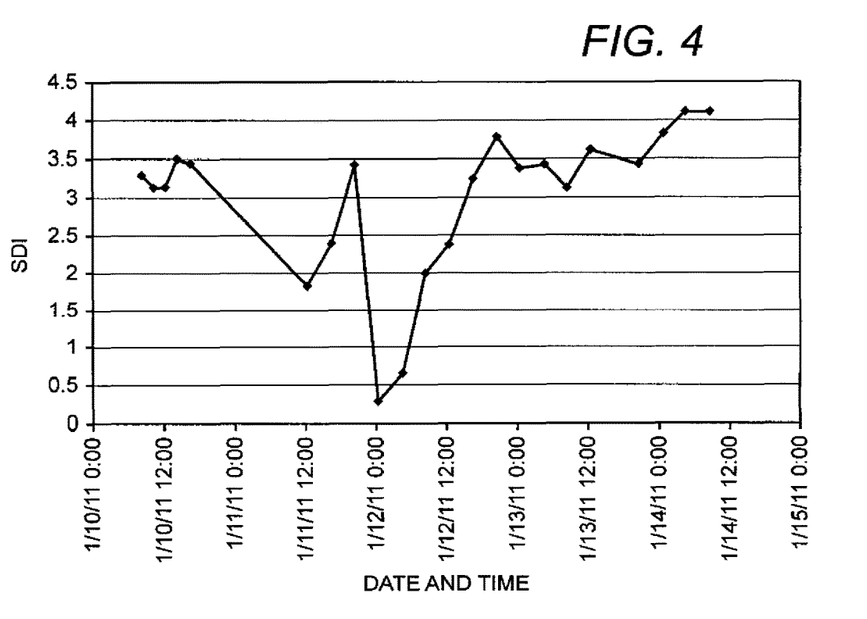
FIG. 4 shows the silt density index (SDI) of the permeate (filtered water) emitted by a coated hollow fiber membrane filter as a function of time during extended testing with the contaminated feed water shown in FIG. 3.

One coated and one uncoated filter were then subjected to extended (15 day) testing at the Naval Surface Warfare Center (Carderock division) using the DARPA fouling water. The turbidity of the contaminated water fed into the inlet of each filter fluctuated in time as shown in FIG. 3. Variations in turbidity were caused by particle aggregation or settling. Typically turbidity values greater than 20 NTU considered challenging. The contaminated water with turbidity values as high as 120 NTU, and average turbidity values around 60 NTU, was very therefore challenging and quickly demonstrated the value of antifouling coating as shown in FIG. 4. FIG. 4 shows the silt density index (SDI) of the corresponding filtered water sampled at the outlet of the coated filter (the contaminated water after filtration). Typically, an SDI of less than 5 is considered adequate filtering if the filtrate is used as a feed for reverse osmosis systems. FIG. 4 shows that the SDI remained <5 for the entire length of the test demonstrating that the filtration process was robust for the entire length of time. The uncoated membrane filter had a similar profile.

Figure 5:
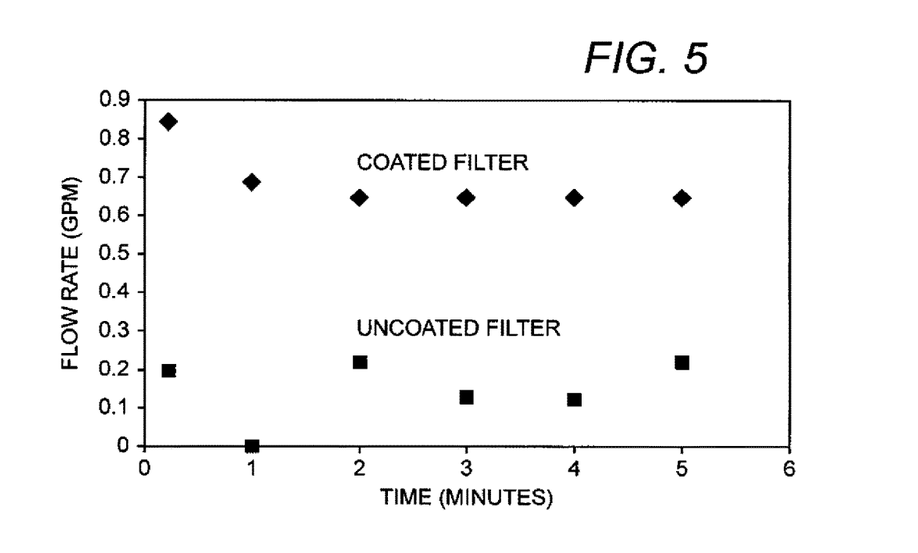
FIG. 5 shows the flow rate of tap water through the coated and uncoated filters after the extended testing shown in FIGS. 3-4.

Once the filtration process was complete, the filters were removed and tested with clean tap water. FIG. 5 shows that the water flux from the coated filter was about threefold higher than the water flux from the uncoated filter suggesting 300% less fouling for the coated filter.

Figure 6:
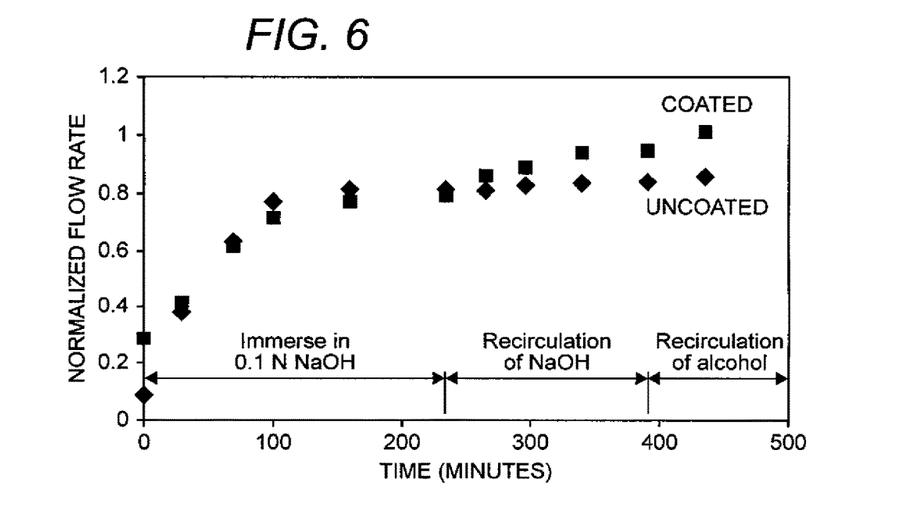
FIG. 6 shows the flux recovery during cleaning for coated and uncoated filters after extended testing with the contaminated feed water and the tap water rinse illustrated in FIGS. 3-4 and FIG. 5, respectively.

Once the initial test was complete, the filters were cleaned as shown in FIG. 6. For the first 230 minutes, the cleaning consisted of immersion in 0.1 N NaOH. From 230 to 390 minutes, the filter was cleaned by recirculating the same solution of 0.1 N NaOH through the membrane capillaries using a small peristaltic pump. From 390 minutes to 435 minutes, the cleaning step consisted of recirculating isopropyl alcohol (IPA) through the capillaries of both filters.

Flux recovered for both filters when exposed to 0.1 N NaOH solution to about 81% of the value before filtration and then stabilized. Whereas the uncoated filter showed little further recovery in flux, the coated filter continued to show increase in flux recovery. The flux in the coated filter recovered to about 94% of original flux after recirculating the NaOH solution, and further recovered to 100% of the original flux after recirculating IPA solution. In contrast, the uncoated filter recovered only about 81% of the original flux after the same treatment. The enhanced recovery of the coated filter during recirculation of NaOH is attributed to additional filter cleaning facilitated by the composite coating on the antifouling membrane, which reduces the force of adhesion of foulants to the filter surface. The enhanced recovery upon cleaning with the alcohol (IPA) is attributed to the removal of the polydopamine-surfactant skin layer induced by dissolution of surfactant in the alcohol phase. The targeted and planned removal of the skin layer, leading to improved flux recovery, is unanticipated for any other known antifouling coating, including those made of pure polydopamine or other hydrophilic polymers.

Figure 7:
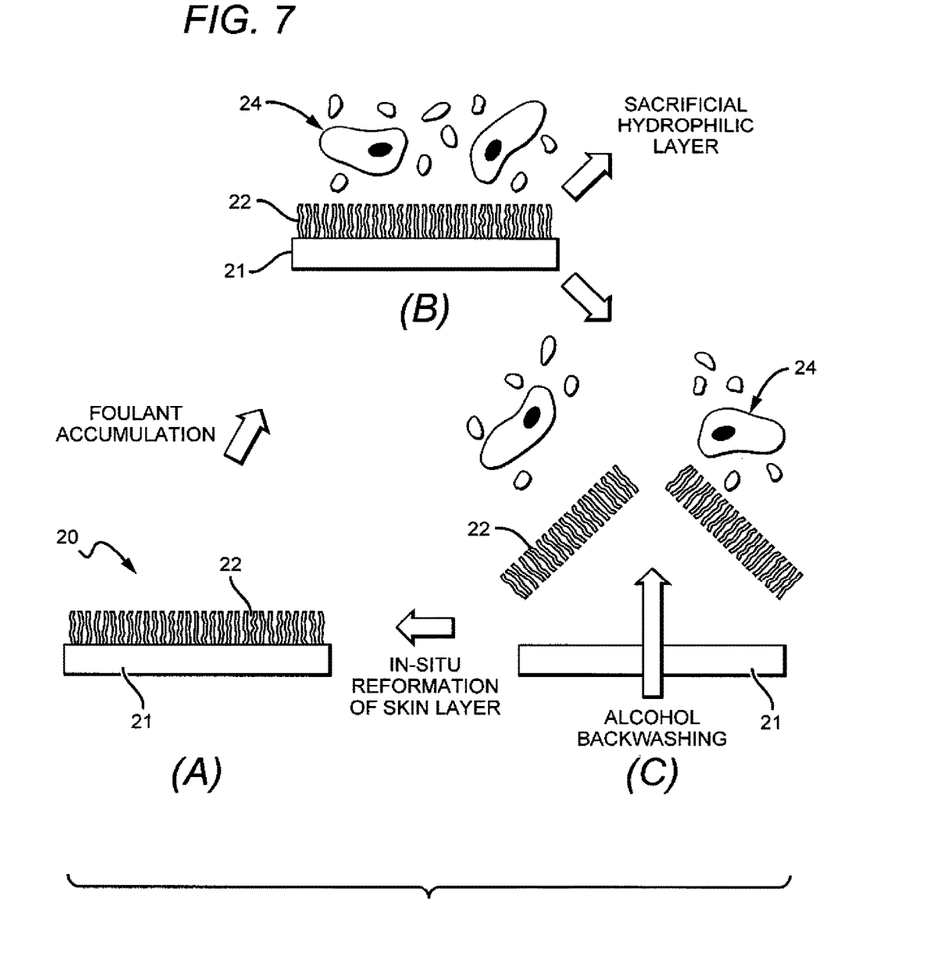
FIG. 7 contains three schematic, cross sectional views of a coated membrane filter undergoing a process of in situ regeneration in accordance with one specific, exemplary embodiment of the invention.

FIG. 7 contains three schematic, cross sectional views of a coated membrane filter undergoing a process of in situ regeneration in accordance with one specific, exemplary embodiment of the invention. The surface 21 of the filter 20 illustrated in FIG. 7A supports a clean sacrificial skin, layer or coating 22. During routine use, the sacrificial layer 22 becomes fouled via the accumulation of particulates and other matter 24 as shown in FIG. 7B, including without limitation biological and chemical materials such as bacteria, algae, and polymerics. The fouled layer can then be removed by backwashing with a removal agent such as alcohol, as illustrated in FIG. 7C, followed by in situ reformation of that layer, thereby cleaning and regenerating the filter 20. In one embodiment of the invention having extended antifouling performance, the first port 5 in FIG. 1A can be used as both an inlet and outlet port for skin reformation.

The cleaning experiments demonstrate (i) the effect of the antifouling skin on enhancing cleaning, and (ii) the novel sacrificial action of dissolving at least a part of the antifouling skin leading to 100% recovery of the original (non-coated membrane) flux.

Once the membranes were cleaned, the skin was reformed on the filters by in-place recoating of the filter module. Upon recoating there was a significant color change, and the pure water flux reduced by only about 5%.

The thickness of the coating was typically less than about 20 nm and preferably is less than about 10 nm. Atomic Force Microscopy (AFM) studies indicate that the coating has a smooth topography and can be so thin that a coated membrane is indistinguishable from an uncoated membrane. The coating therefore appears to be a smooth, evenly layered nanostructure. In contrast, hydrophilic polymer layers deposited in the absence of surfactant typically form a much thicker layer on top of the pores, usually 20-100 nm thick with an uneven thickness that can produce hydraulic resistance.

It is important to note that this coating process is unique and novel. Whereas, in coating processes disclosed elsewhere, the coating solutions are either simply contacted with the membrane or coated on top of the membrane using methods such as dip, spin, spray or doctor blading etc., the coating described herein is produced by actively pushing the coating solution through the membrane. Furthermore, although actively pushing a coating solution through membranes when using other coating materials or methods will result in clogging up of the pores of the membrane with excess polymer/composite materials, such clogging is not observed using the coating compositions and methods disclosed herein. The active push/flush through method also enables simple recoating of the membrane in the field in situ, a important practical consideration because most foul resistant coatings are degraded during filter operation and typical maintenance steps. The active push through method is also enabled by the fact that polymeric particles do not form in the surfactant rich coating solution over a period of at least 24 hrs. In contrast, for polydopamine-based coating solutions such as those disclosed, for example, in US Patent Application No. 2010/0059433, polymeric particles homogenously precipitate in the coating solution starting at about 10 minutes and therefore the coating solution cannot be pushed through the membrane. Furthermore, in addition to the active push through method, a much more stable coating solution is enabled due to the presence of a relatively large surfactant concentration that apparently slows down polymer formation.

EXAMPLE 2

X-ray photoelectron spectroscopy (XPS) studies of a layer of polysulfone coated with the same composition described in Example 1 yielded a peak ratio analysis consistent with a 75% polydopamine/25% surfactant composition by mass as shown in Table 1. The XPS probe depth was about 3-8 nm deep and assumed to be an appropriate surface analysis tool.

TABLE 1

| Sample | C(1s) to O(1s) Ratio | S(1s) to O(1s) ratio | N (1s) to O(1s) ratio |
|---|---|---|---|
| Polydopamine | 1.36 | 0.077 | 0.086 |
| Surfactant | 0.89 | 0.154 | 0.093 |
| Polysulfone | 0.86 | 0.092 | 0.099 |
| Polydopamine-Surfactant Coating | 1.26 | 0.099 | 0.092 |

In addition, the ratio of C—OH (C 1s) to O (1s) intensity was much higher for the polydopamine-surfactant coated samples relative to uncoated samples, and N (1s) was also higher for coated samples. These results clearly suggest the presence of thin, nitrogen rich, hydrophilic layer and are consistent with much faster absorption of water.

By way of example and not by way of limitation, the coating of the invention may be used to increase flux through any filter fabricated from hydrophobic material, hydrophilic material, or combinations/blends thereof. Examples of such filters include, but are not limited to, reverse osmosis membranes, nanofiltration membranes, ultrafiltration membranes, microfiltration membranes and media filters.

Any hydrophilic polymer which associates with the filter material can be used in the coating composition. Preferably, the hydrophilic polymer is selected from the group consisting of polydopamine, polyethylene, polyethylene glycol, polyacrylamide, polysaccharide, and combinations thereof.

Any surfactant which undergoes a suitable phase change upon exposure to external media, including without limitation exposure to an external saline solution, can be used in the coating composition. Any surfactant that contains at least 16 carbon atoms and can be induced to undergo a phase change is suitable for use in the composition, including without limitation N-erucyl-N,N-bis(2-hydroxyethyl)-N-methyl ammonium chloride which can undergo a phase change when exposed to saline. Preferably, the size of at least one carbon chain in the surfactant should be greater than 16 carbon atoms. More preferably, at least one carbon chain should contain 16-24 carbon atoms.

Coating compositions suitable for the invention may include those containing 10%-99% surfactant, and preferably 25%-99% surfactant.

Although one specific method for fabricating a conformal coating on a membrane is disclosed herein, any coating method suitable for providing a conformal coating to a filter material can be used. Preferably, the coating is thin or uniform. More preferably, the coating is thin and uniform.

Coating removal agents suitable for use with the invention include without limitation alcohols, bleach, inorganic acids or bases, and enzymes capable of removing organic material from membranes or other types of filters.

While several illustrative embodiments of the invention have been disclosed herein, still further variations and alternative embodiments will occur to those skilled in the art. Therefore, the coated membrane forming one aspect of the invention can be useful wherever the prevention of filter fouling is an important goal and, accordingly, is amenable to a broad range of applications including without limitation, and in addition to those described above, seawater prefiltration as well as food, pharmaceutical, and biotechnology water treatment. Such variations and alternative embodiments are contemplated, and can be made without departing from the spirit and scope of the invention as defined in the appended claims.

We claim:
1. A filtration membrane, comprising:
   a membrane comprising coated pores, said pores coated with a coating solution comprising:
   N-erucyl-N,N-bis(2-hydroxyethyl)-N-methyl ammonium chloride (EMHAC),
   wherein the concentration of EMHAC in said coating solution is greater than 20 wt %; and
   polydopamine, said coating solution comprising less than 1% polydopamine;
   such that the thickness of the resulting coating is less than or equal to 20 nm.
2. The filtration membrane of claim 1, wherein said membrane is selected from the group consisting of an ultrafiltration membrane, a microfiltration membrane, a nanofiltration membrane, a reverse osmosis membrane, a mesh filter or a media filter.

* * * * *